(12) United States Patent
Emam et al.

(10) Patent No.: US 7,831,525 B2
(45) Date of Patent: Nov. 9, 2010

(54) AUTOMATED ENERGY TRANSFER CALCULATION AND COMPENSATION

(75) Inventors: Ossama Emam, Giza (EG); Dimitri Kanevsky, Ossining, NY (US); Irina Rish, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 12/206,611

(22) Filed: Sep. 8, 2008

(65) Prior Publication Data
US 2010/0063766 A1    Mar. 11, 2010

(51) Int. Cl.
*G01R 21/133* (2006.01)
*G06Q 40/00* (2006.01)
*G06F 11/30* (2006.01)

(52) U.S. Cl. .......................... 705/412; 705/40; 702/182
(58) Field of Classification Search ................... 705/40, 705/412; 702/182
See application file for complete search history.

(56) References Cited

U.S. PATENT DOCUMENTS

2004/0158541 A1* 8/2004 Notarianni et al. .......... 705/412
2006/0241905 A1* 10/2006 McCalla ..................... 702/182
2008/0243687 A1* 10/2008 Johnson et al. ............... 705/40
2009/0299919 A1* 12/2009 Frutkin ....................... 705/412

FOREIGN PATENT DOCUMENTS

WO    WO 2004057288 A1 *  7/2004

OTHER PUBLICATIONS

Luther, Mark Brandt, Arch. Dr., "A Dynamic Evaluation of Glazing Thermal Performance", 1995, University of Michigan, (AAT 9527572), 311 pages.*

* cited by examiner

*Primary Examiner*—Fadey S Jabr
(74) *Attorney, Agent, or Firm*—Lee Law, PLLC; Christopher B. Lee

(57) ABSTRACT

Thermal energy transfer between the adjoining building units is measured. Actual energy consumption is measured in each of the adjoining building units. An energy compensation is calculated for each of the adjoining building units based upon the measured thermal energy transfer between the adjoining building units and the measured actual energy consumption in each of the adjoining building units. This abstract is not to be considered limiting, since other embodiments may deviate from the features described in this abstract.

10 Claims, 6 Drawing Sheets

AUTOMATED ENERGY TRANSFER CALCULATION AND COMPENSATION

BACKGROUND OF THE INVENTION

1. Field of the Invention

The present invention relates to systems and methods for determining energy transfer between units within the same building. More particularly, the present invention relates to automated energy transfer calculation and compensation.

2. Related Art

Apartment and office building structures are often constructed with multiple floors such that units are stacked vertically within the structure. Insulation is placed between the floors and on exterior walls to limit sound and heat transfer. During summer months, air conditioners are used to cool the units within the structures. During winter months, heaters are used to heat the units within the structures.

BRIEF SUMMARY OF THE INVENTION

The subject matter described herein provides automated energy transfer calculation and compensation. The automated energy transfer calculation and compensation applies to thermally connected structures, such as apartment units, condominiums, and other building units with a partition constructed between adjoining units. A wall and a floor/ceiling combination represent example partitions. For example, vertically-oriented building units are considered thermally connected when rising heat may pass from a lower building unit to an upper building unit through a ceiling/floor partition in winter and conversely with respect to cool air in summer. Actual energy consumption is measured in each adjoining building unit and thermal energy transfer is measured between the adjoining building units. An energy compensation is calculated for each of the adjoining building units based upon the measured thermal energy transfer and to the measured actual energy consumption in each of the adjoining building units. The energy compensation is used to adjust energy charges for building units that experience thermal energy transfer to or from an adjoining building unit. The calculated energy compensation may be further adjusted based upon expected energy consumption, insulation materials and ratings, age of the adjoining building units, and other factors.

A method includes measuring thermal energy transfer between the adjoining building units; measuring actual energy consumption in each of the adjoining building units; and calculating an energy compensation for each of the adjoining building units based upon the measured thermal energy transfer between the adjoining building units and the measured actual energy consumption in each of the adjoining building units.

A system includes a memory adapted to store information associated with energy consumption; and a processor programmed to measure thermal energy transfer between the adjoining building units, measure actual energy consumption in each of the adjoining building units, and calculate an energy compensation for each of the adjoining building units based upon the measured thermal energy transfer between the adjoining building units and the measured actual energy consumption in each of the adjoining building units.

An alternative system includes a memory adapted to store information associated with energy consumption; and a processor programmed to measure at least two temperature values of at least two positions within a partition between the adjoining building units, the at least two positions located at different distances from a surface of the partition within at least one of the adjoining building units, process the at least two temperature values using at least one of a linear equation, a polynomial equation, and a gradient equation, extrapolate a thermal energy transfer from the processed at least two temperature values, measure actual energy consumption in each of the adjoining building units, calculate an energy compensation for each of the adjoining building units based upon the measured thermal energy transfer between the adjoining building units and the measured actual energy consumption in each of the adjoining building units, where in being adapted to calculate the energy compensation for each of the adjoining building units, the processor is further programmed to: determine an expected energy consumption for each of the adjoining building units based upon at least one of a volume of each of the adjoining building units, historical thermostat setting information for each of the adjoining building units, historical energy consumption for each of the adjoining building units, and historical environmental temperature data in an area of the adjoining building units, calculate a difference in the measured actual energy consumption for each of the adjoining building units relative to the expected energy consumption for each of the adjoining building units, and adjust the calculated energy compensation based upon the calculated difference, and send the adjusted calculated energy compensation for each of the adjoining building units to a utility server for billing adjustment.

Those skilled in the art will appreciate the scope of the present invention and realize additional aspects thereof after reading the following detailed description of the preferred embodiments in association with the accompanying drawing figures.

BRIEF DESCRIPTION OF THE SEVERAL VIEWS OF THE DRAWINGS

The accompanying drawing figures incorporated in and forming a part of this specification illustrate several aspects of the invention, and together with the description serve to explain the principles of the invention.

DETAILED DESCRIPTION OF THE INVENTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides automated energy transfer calculation and compensation. The automated energy transfer calculation and compensation applies to thermally connected structures, such as apartment units, condominiums, and other building units with a partition constructed between adjoining units. A wall and a floor/ceiling combination represent example partitions. For example, vertically-oriented building units are considered thermally connected when rising heat may pass from a lower building unit to an upper building unit through a ceiling/floor partition in winter and conversely with respect to cool air in summer. Actual energy consumption is measured in each adjoining building unit and thermal energy transfer is measured between the adjoining building units. An energy compensation is calculated for each of the adjoining building units based upon the measured thermal energy transfer and to the measured actual energy consumption in each of the adjoining building units. The energy compensation is used to adjust energy charges for building units that experience thermal energy transfer to or from an adjoining building unit. The calculated energy compensation may be further adjusted based upon expected energy consumption, insulation materials and ratings, age of the adjoining building units, and other factors.

Figure 1:
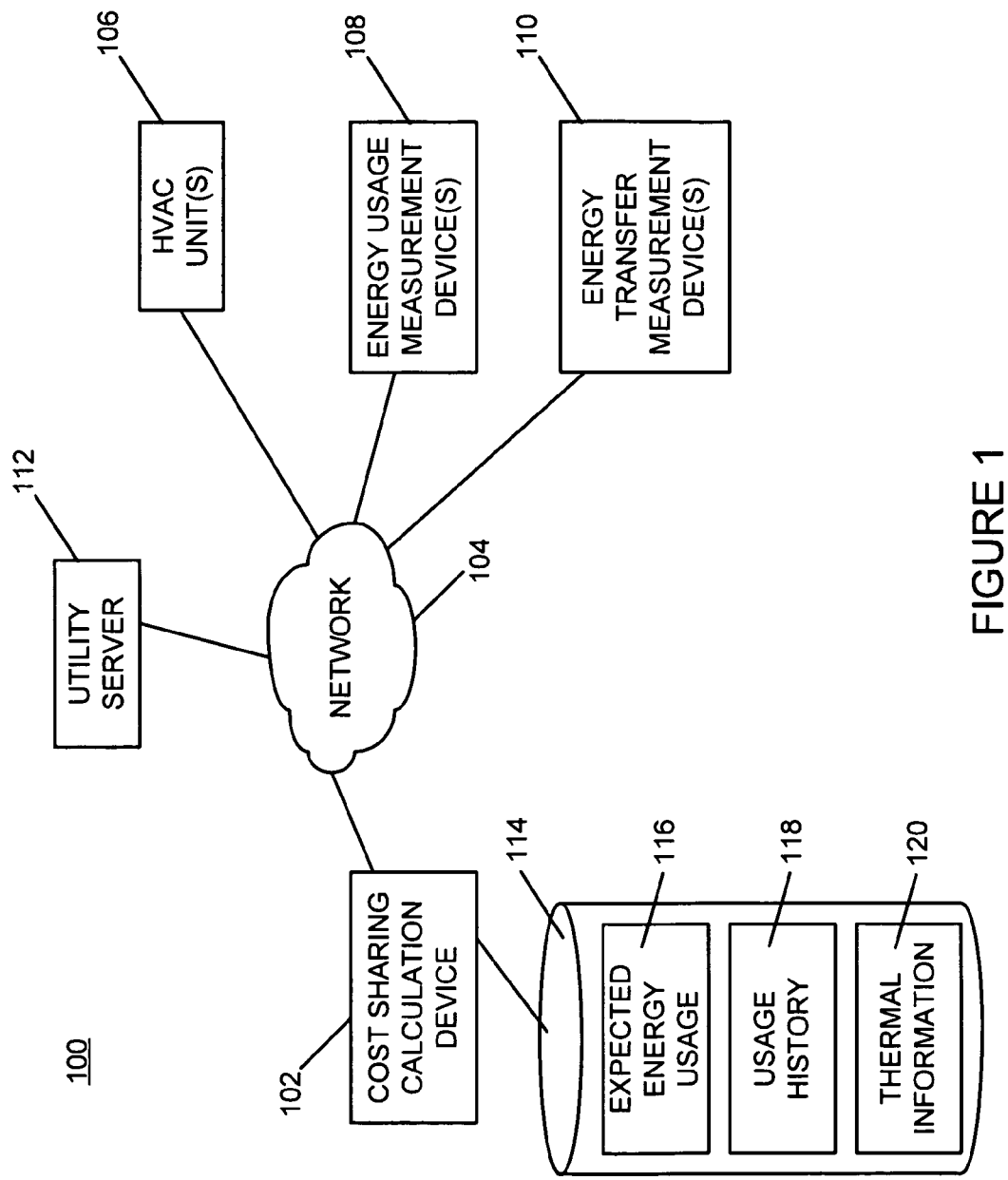
FIG. 1 is a block diagram of an example of an implementation of a system for automated energy transfer calculation and compensation according to an embodiment of the present subject matter.
Figure 2:
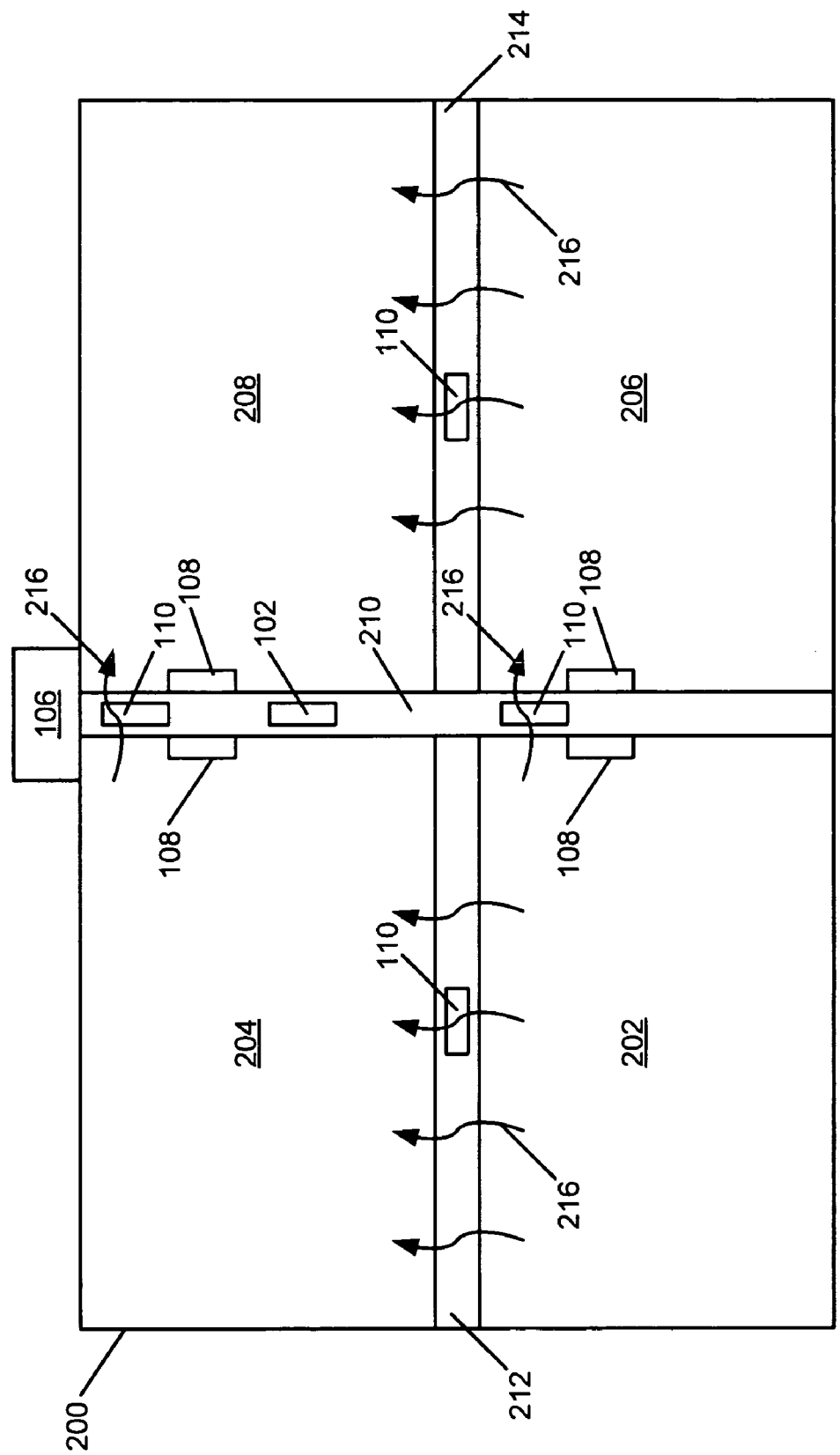
FIG. 2 is a cross section of an example of an implementation of a building unit environment suitable for use of components of a system for automated energy transfer calculation and compensation according to an embodiment of the present subject matter.

FIG. 1 is a block diagram of an example of an implementation of a system 100 for automated energy transfer calculation and compensation. Within the system 100, a cost sharing calculation device 102 is illustrated. As will be described in more detail below and in association with FIGS. 2 through 6, the cost sharing calculation device 102 provides automated energy transfer calculation and compensation based upon measured thermal transfer between adjoining building units and measured actual energy consumption for the adjoining building units. FIG. 2 below illustrates a cross section of an example building unit environment suitable for use of components of the system 100 for automated energy transfer calculation and compensation.

It should be noted that the cost sharing calculation device 102 may be a portable computing device, such as used by utility meter reader traveling to collect utility meter readings from different buildings/building units. The cost sharing calculation device 102 may also be a stationary computing device located in association with a building unit or may be a stationary computing device associated with a utility billing system. It should also be noted that the cost sharing calculation device 102 may be any computing device capable of processing information as described above and in more detail below. For example, the cost sharing calculation device 102 may include devices such as a personal computer (e.g., desktop, laptop, palm, etc.) or a handheld device (e.g., cellular telephone, personal digital assistant (PDA), email device, music recording or playback device, etc.), or any other device capable of processing information as associated with the present subject matter.

The cost sharing calculation device 102 is shown interconnected via a network 104 to one or more heating ventilation and air conditioning (HVAC) units 106, one or more energy usage measurement devices 108, one or more energy transfer measurement devices 110, and a utility server 112. The network 104 includes any form of interconnection suitable for the intended purpose, including a private or public network such as an intranet or the Internet, respectively, direct inter-module interconnection, dial-up, or any other interconnection mechanism capable of interconnecting the devices.

The HVAC units 106 may include heat pump units, air conditioning and furnace units, or any other heating, ventilation, and air conditioning units, whether powered by natural gas, propane, electricity, or other energy source. The energy usage measurement devices 108 include thermostats, thermometers, electric power meters, natural gas meters, propane meters, or any other energy measurement device capable of providing energy usage information usable by the cost sharing calculation device 102 for the information processing described herein.

The energy transfer measurement devices 110 include sensors or pairs of sensors, thermometers (e.g., electronic thermometers), thermal gradient sensors, or any other sensor or pairs of sensors, as appropriate, that are capable of providing thermal measurements at different physical points within a partition between adjoining building units. As described above, a partition includes a wall and/or ceiling/floor partition between adjoining building units. As such, the energy transfer measurement device 110 includes any device capable of measuring thermal energy transfer across a partition between adjoining building units relative to a temperature or thermal characteristic in any one of the adjoining building units.

The utility server 112 includes a web-based server, dial-up server, or other computing device with communication and information capabilities associated with an energy utility. The utility server 112 provides a communication interface for the cost sharing calculation device 102 for utility billing adjustment or other information sharing associated with the cost sharing calculation device 102.

A database 114 is associated with the cost sharing calculation device 102 and provides storage capabilities for information associated with the automated energy transfer calculation and compensation performed by the cost sharing calculation device 102. The database 114 includes an expected energy usage storage area 116, a usage history storage area 118, and a thermal information storage area 120. Information within the expected energy usage storage area 116, the usage history storage area 118, and the thermal information storage area 120 may be stored in the form of tables or other arrangements accessible by the cost sharing calculation device 102.

The expected energy usage storage area 116 includes expected energy usage information associated with adjoining building units. The expected energy usage information may include information derived or calculated from information, such as volume of each of adjoining building unit, or other information described below to determine expected energy usage for adjoining building units.

The usage history storage area 118 includes energy usage history information either stored over time by the cost sharing calculation device 102 or received from the utility server 112 for processing purposes. The energy usage history information includes information, such as historical thermostat setting information for each of the adjoining building units and historical energy consumption for each of the adjoining building units. The energy usage history information may be used by the cost sharing calculation device 102 to determine expected energy consumption for each of the adjoining building units.

The thermal information storage area 120 includes thermal information associated with thermal characteristics of the adjoining building units or the environment within which the adjoining building units are located. The thermal information includes information, such as historical environmental temperature data for a geographic area within which the adjoining building units are located and thermal properties for building materials (e.g., insulation type, insulation rating, age, etc.). The thermal information may be used by the cost sharing calculation device 102 to further determine the expected energy consumption for each of the adjoining building units.

FIG. 2 is a cross section of an example of an implementation of a building unit environment suitable for use of components of the system 100 for automated energy transfer calculation and compensation. Though components of the system 100 are shown in certain locations within the example of FIG. 2, it is understood that the example locations are not limiting and that placement of the components shown may be varied without departure from the scope of the present subject matter. Additionally, several of the components may be located at any location that provides interconnection capabilities as described above, including interconnection via wireless communication.

Within FIG. 2, a building structure 200 is illustrated with a lower left building unit 202, an upper left building unit 204, a lower right building unit 206, and an upper right building unit 208. For purposes of the present description, each of the building units 202 through 208 may be considered adjoining if they share a partition, such as a wall or ceiling/floor combination partition, that allows thermal energy transfer between the respective building units.

For example, the partition wall section 210 represents a partition separating the upper left building unit 204 from the upper right building unit 208. The partition wall section 210 also represents a partition separating the lower left building unit 202 from the lower right building unit 206. Accordingly, the upper left building unit 204 and the upper right building unit 208 are considered adjoining building units. Additionally, the lower left building unit 202 and the lower right building unit 206 are also considered adjoining building units.

Additionally, ceiling/floor partitions 212 and 214 separate the lower left building unit 202 from the upper left building unit 204 and the lower right building unit 206 from the upper right building unit 208, respectively. Accordingly, the lower left building unit 202 and the upper left building unit 204 are considered adjoining building units. Additionally, the lower right building unit 206 and the upper right building unit 208 are considered adjoining building units.

As described above, any building units in relation to one another that allows thermal energy transfer between the respective building units may be considered adjoining units. As such, the lower left building unit 202 and the upper right building unit 208 and the lower right building unit 206 and the upper left building unit 204 may also be considered adjoining building units for purposes of the present subject matter.

The cost sharing calculation device 102 is shown at an example location within the partition wall 210 between the upper left building unit 204 and the upper right building unit 208. The network 104 is not illustrated within FIG. 2 for ease of illustration purposes. However, it is understood that the network 104 interconnects the respective devices as described above in association with FIG. 1. One HVAC unit 106 is illustrated mounted on top of the building structure 200. It is understood that more than one HVAC unit 106 may be used.

Four energy usage measurement devices 108 are illustrated in association with each of the building units 202 through 208 in example locations. As described above, the energy usage measurement devices 108 may include thermostats, thermometers, electric power meters, natural gas meters, propane meters, or any other energy measurement device capable of providing energy usage information usable by the cost sharing calculation device 102. Further, when the energy usage measurement devices 108 are embodied as electric power meters, natural gas meters, or propane meters they may be located on an outside portion of the building structure 200, or if networked to the utility server 112 (shown in FIG. 2) they may be located at any location in association with the respective building units. Further, based upon communication capabilities, the energy usage measurement devices 108 may be located in association with the utility server 112 without departure from the scope of the present subject matter.

Four energy transfer measurement devices 110 are illustrated at example locations within the building structure 200. The energy transfer measurement devices 110 measure thermal energy transfer 216 between the adjoining building units. For example, in winter when the HVAC unit 106 produces warm air, the thermal energy transfer 216 may attempt to rise from the lower left building unit 202 to the upper left building unit 204 and from the lower right building unit 206 to the upper right building unit 208. The converse may occur in summer when the HVAC unit 106 produces cold air. Additionally, the thermal energy 216 may also attempt to transfer across the partition wall section 210 in either direction between the lower left building unit 202 and the lower right building unit 206 and between the upper left building unit 204 and the upper right building unit 208. It is also possible for the thermal energy to attempt to transfer across the partition wall section 210 (not shown) from any of the lower building units 202 and 206 to the upper building units 208 and 204, respectively, or vice versa depending upon the operating mode of the HVAC unit 106, insulation properties of the respective partitions, and environmental conditions.

Accordingly, FIG. 2 represents a cross section of an example implementation of the building structure 200 suitable for use of components of the system 100 for automated energy transfer calculation and compensation. Many other orientations of the respective components are possible and all are considered within the scope of the present subject matter.

Figure 3:
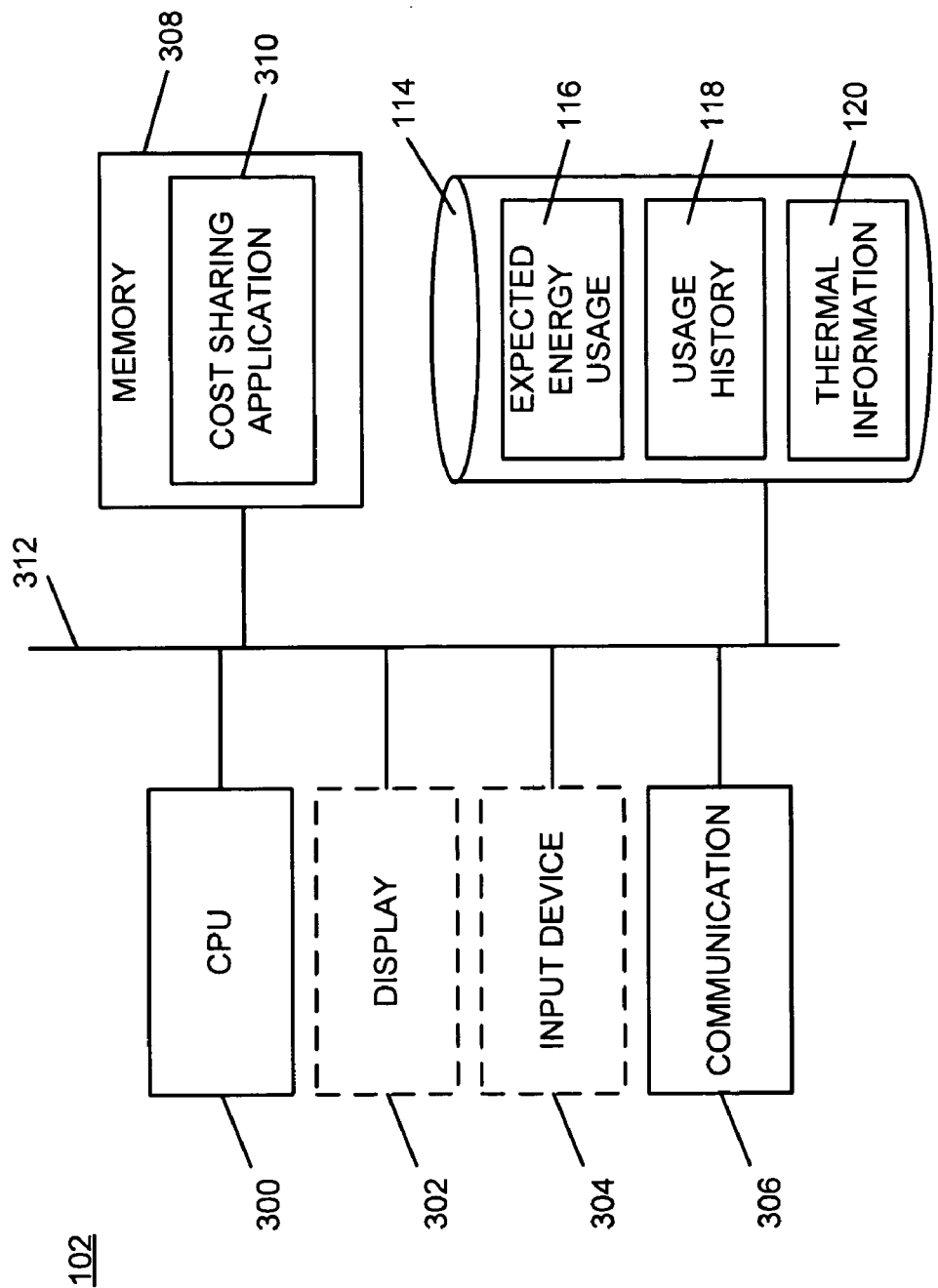
FIG. 3 is a block diagram of an example of an implementation of the cost sharing calculation device that is capable of performing automated energy transfer calculation and compensation based upon measured thermal energy transfer between adjoining building units and measured actual energy consumption in each of the adjoining building units according to an embodiment of the present subject matter.

FIG. 3 is a block diagram of an example of an implementation of the cost sharing calculation device 102 that is capable of performing automated energy transfer calculation and compensation based upon measured thermal energy transfer between adjoining building units and measured actual energy consumption in each of the adjoining building units. A central processing unit (CPU) 300 provides computer instruction execution, computation, and other capabilities within the cost sharing calculation device 102. A display 302 provides visual information to a user of the cost sharing calculation device 102 and an input device 304 provides input capabilities for the user.

The display 302 may include any display device, such as a cathode ray tube (CRT), liquid crystal display (LCD), light emitting diode (LED), projection, touchscreen, or other display element or panel. The input device 304 may include a computer keyboard, a keypad, a mouse, a pen, a joystick, or any other type of input device by which the user may interact with and respond to information on the display 302.

It should be noted that the display 302 and the input device 304 are illustrated with a dashed-line representation within FIG. 3 to indicate that they are not required components for the cost sharing calculation device 102. Accordingly, the cost sharing calculation device 102 may operate as a completely automated embedded device, client-based device, or server-based device without user configurability or feedback. However, the cost sharing calculation device 102 may also provide user feedback and configurability via the display 302 and the input device 304, respectively.

A communication module 306 provides interconnection capabilities that allow the cost sharing calculation device 102 to communicate with other modules within the system 100. For example, the cost sharing calculation device 102 may communicate via the communication module 306 with the one or more HVAC units 106, the one or more energy usage measurement devices 108, and the one or more energy transfer measurement devices 110, to receive and process thermal energy consumption and transfer information. The cost sharing calculation device 102 may communicate via the communication module 306 with the utility server 112 to provide energy compensation information, such as energy compensation values or parameters, for billing adjustment purposes.

The communication module 306 may include any electrical, protocol, and protocol conversion capabilities useable to provide the interconnection capabilities. Though the communication module 306 is illustrated as a component-level module for ease of illustration and description purposes, it should be noted that the communication module 306 includes any hardware, programmed processor(s), and memory used to carry out the functions of the communication module 306 as described above and in more detail below. For example, the communication module 306 may include additional controller circuitry in the form of application specific integrated circuits (ASICs), processors, antennas, and/or discrete integrated circuits and components for performing communication and electrical control activities associated with the communication module 306. Additionally, the communication module 306 also includes interrupt-level, stack-level, and application-level modules as appropriate. Furthermore, the communication module 306 includes any memory components used for storage, execution, and data processing for performing processing activities associated with the communication module 306. The communication module 306 may also form a portion of other circuitry described without departure from the scope of the present subject matter.

A memory 308 includes a cost sharing application 310. The cost sharing application 310 provides automated energy transfer calculation and compensation for the cost sharing calculation device 102, as described above and in more detail below. The cost sharing application 310 includes instructions executable by the CPU 300 for performing these functions. The CPU 300 executes these instructions to provide the processing capabilities described above and in more detail below for cost sharing calculation device 102.

The cost sharing application 310 may form a portion of an interrupt service routine (ISR), a portion of an operating system, a portion of a browser application, or a portion of a separate application without departure from the scope of the present subject matter. The cost sharing application 310 may also process information stored within the database 114, as described above, for the automated energy transfer calculation and compensation of a computing device, such as the cost sharing calculation device 102.

It should be noted that while the cost sharing application 310 is illustrated within the memory 308, the cost sharing application 310 may be implemented as a stand-alone hardware or combined module without departure from the scope of the present subject matter. In such an implementation, the cost sharing application 310 includes any hardware, programmed processor(s), and memory used to carry out the functions of the cost sharing application 310 as described above and in more detail below. For example, the cost sharing application 310 may include additional controller circuitry in the form of application specific integrated circuits (ASICs), processors, antennas, and/or discrete integrated circuits and components for performing communication and electrical control activities associated with the cost sharing application 310. Additionally, the cost sharing application 310 also includes interrupt-level, stack-level, and application-level modules as appropriate. Furthermore, the cost sharing application 310 includes any memory components used for storage, execution, and data processing for performing processing activities associated with the cost sharing application 310. The cost sharing application 310 may also form a portion of other circuitry described without departure from the scope of the present subject matter.

It is understood that the memory 308 may include any combination of volatile and non-volatile memory suitable for the intended purpose, distributed or localized as appropriate, and may include other memory segments not illustrated within the present example for ease of illustration purposes. For example, the memory 308 may include a code storage area, a code execution area, and a data area without departure from the scope of the present subject matter.

The CPU 300, the display 302, the input device 304, the communication module 306, the memory 308, and the database 114 are interconnected via an interconnection 312. The interconnection 312 may include a system bus, a network, or any other interconnection capable of providing the respective components with suitable interconnection for the respective purpose.

It should be noted that the components within the cost sharing calculation device 102 may be co-located or distributed and interconnected via a network without departure from the scope of the present subject matter. For a distributed arrangement, the display 302 and the input device 304 may be located at point of sale device, kiosk, or other location associated with the building structure 200, while the CPU 300 and memory 308 may be located at a local or remote server. Many other possible arrangements for components of the cost sharing calculation device 102 are possible and all are considered within the scope of the present subject matter. It should also be understood that, though the expected energy usage storage area 116, the usage history storage area 118, and the thermal information storage area 120 are shown within the database 114, they may also be stored within the memory 308 without departure from the scope of the present subject matter.

Figure 4:
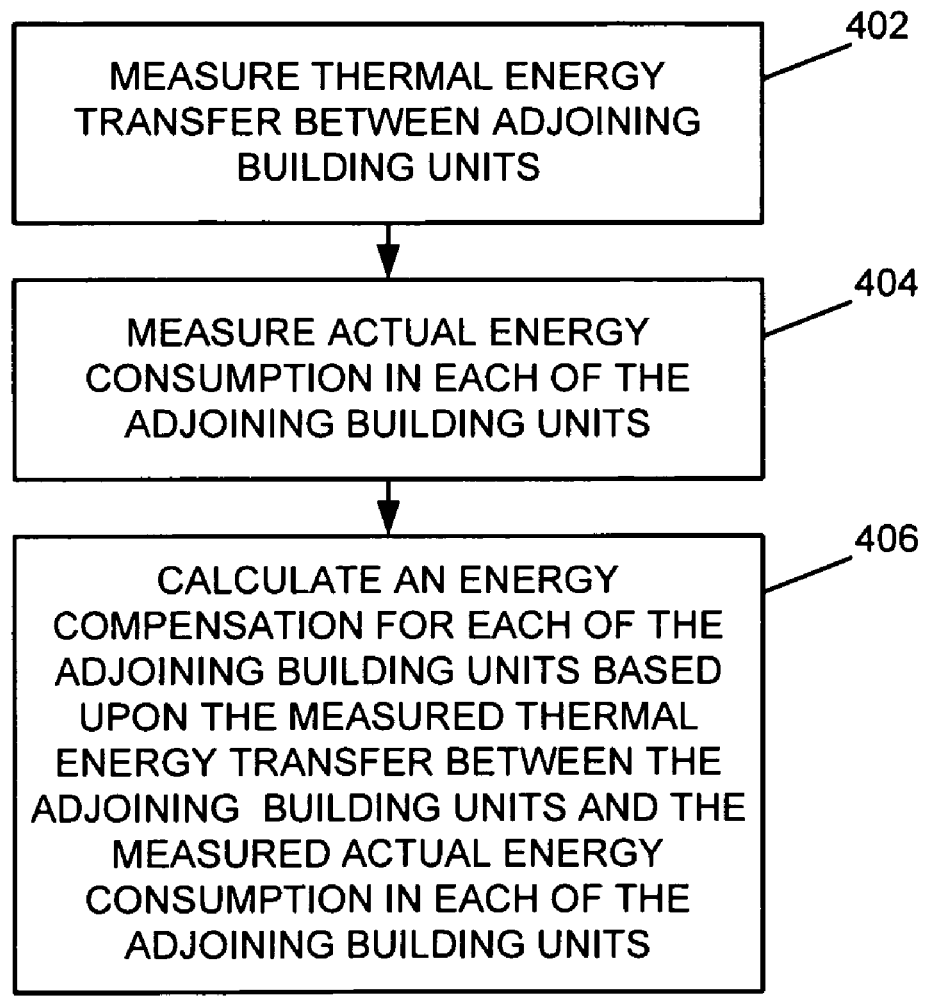
FIG. 4 is a flow chart of an example of an implementation of process for performing automated energy transfer calculation and compensation based upon measured thermal energy transfer between adjoining building units and measured actual energy consumption in each of the adjoining building units according to an embodiment of the present subject matter.
Figure 5:
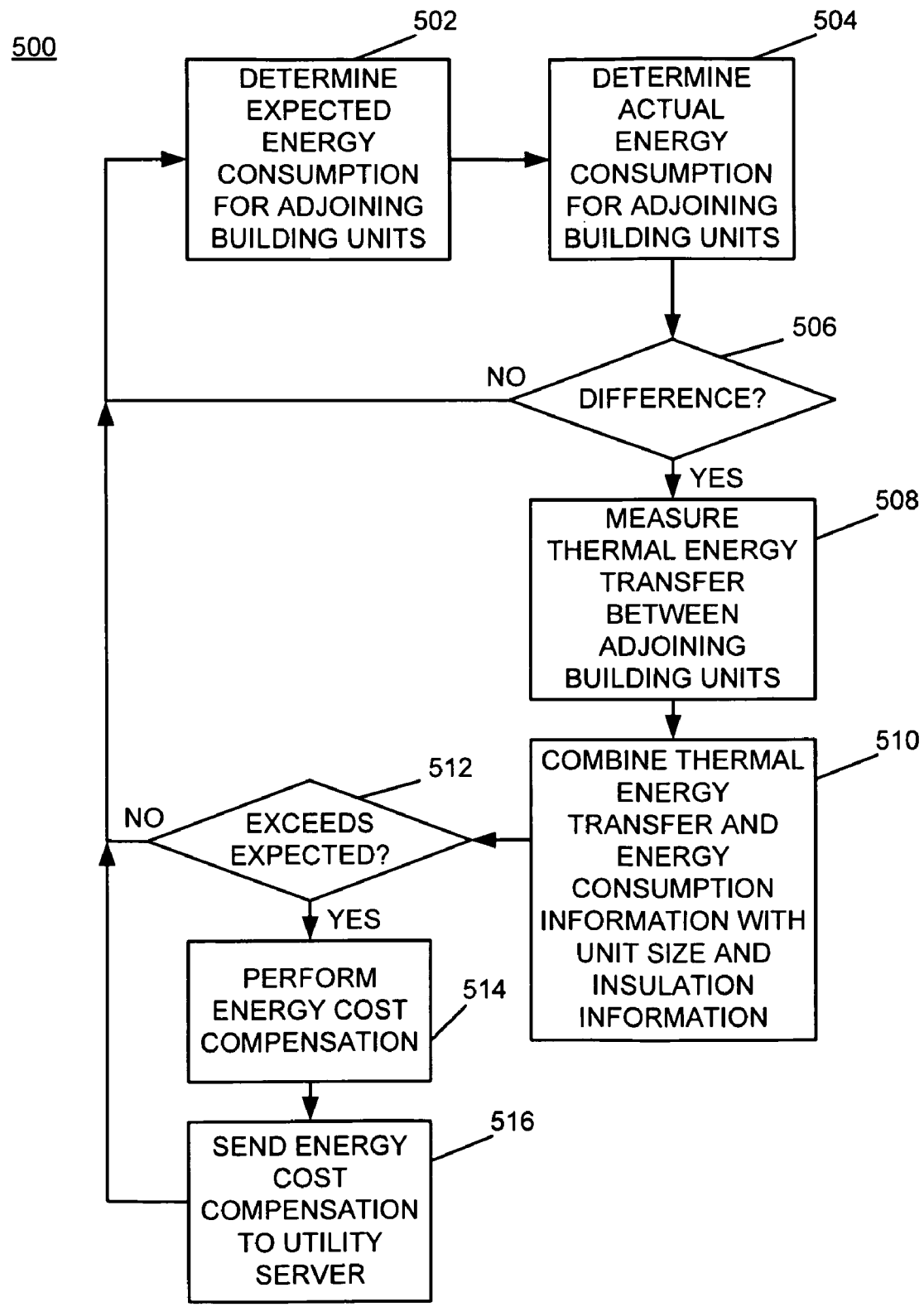
FIG. 5 is a flow chart of an example of an implementation of process for performing automated energy transfer calculation and compensation based upon measured thermal energy transfer between adjoining building units, measured actual energy consumption in each of the adjoining building units, expected energy consumption for the adjoining building units, and unit size and insulation information according to an embodiment of the present subject matter.
Figure 6:
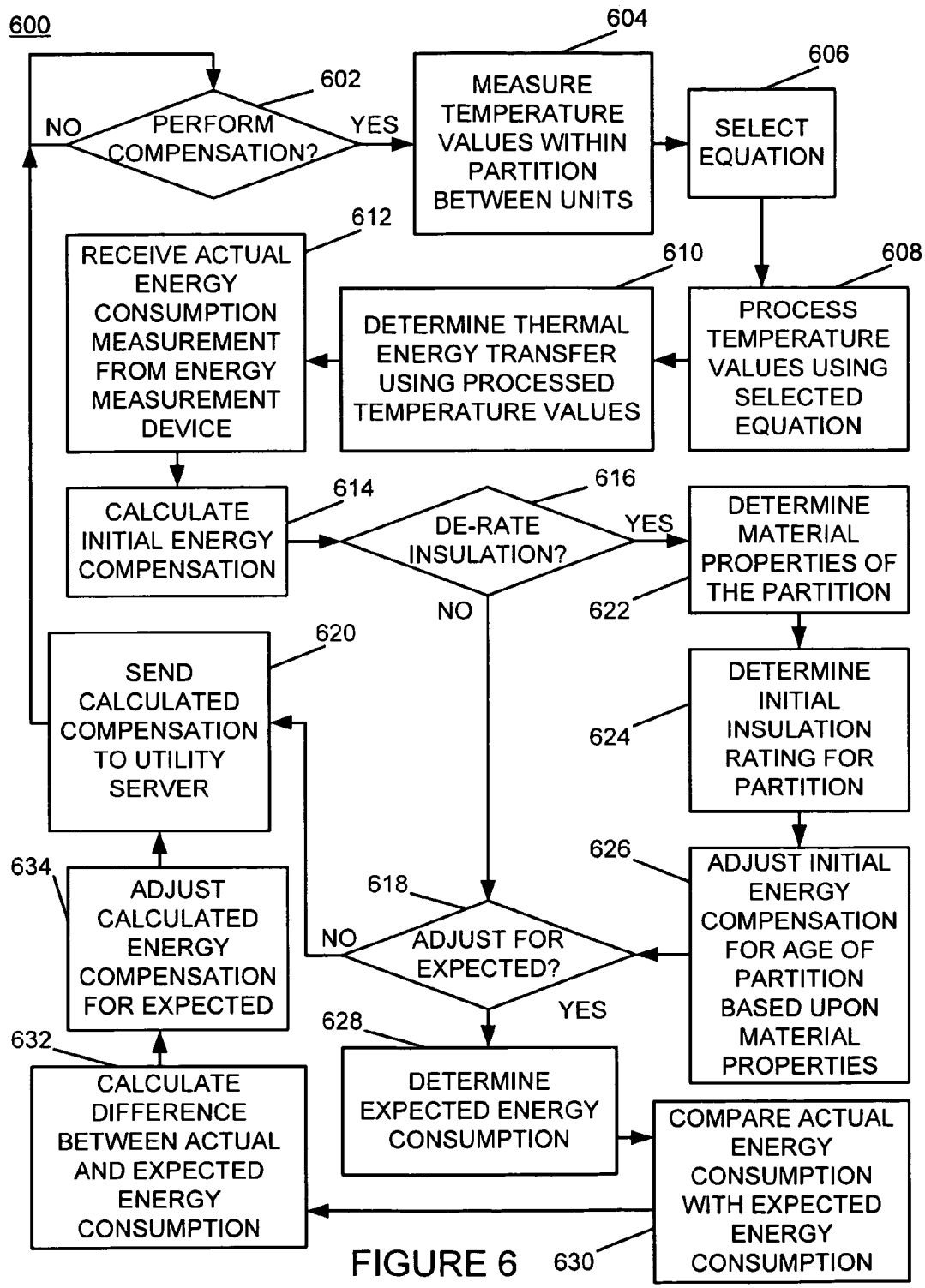
FIG. 6 is a flow chart of an example of an implementation of process for performing automated energy transfer calculation and compensation based upon measured thermal energy transfer between adjoining building units, measured actual energy consumption in each of the adjoining building units, de-rated insulation ratings based upon materials and age of insulation, and expected energy consumption in each of the adjoining building units according to an embodiment of the present subject matter.

Accordingly, the cost sharing calculation device 102 may take many forms and may be associated with many platforms. FIG. 4, FIG. 5, and FIG. 6 below describe example processes that may be executed by the cost sharing calculation device 102 and/or the cost sharing application 310 executed by the CPU 300 to perform the automated energy transfer calculation and compensation of the cost sharing calculation device 102.

FIG. 4, FIG. 5, and FIG. 6 below illustrate example processing that may be performed in association with the present subject matter and that may be executed by a device, such as the CPU 300 of the cost sharing calculation device 102. Alternatively, the processes described may be executed by separate processing components within or associated with the cost sharing calculation device 102, as described above and as appropriate. It should be noted that time out procedures and other error control procedures as well as certain query and response activities are not illustrated within the example processes for ease of illustration purposes. However, it is understood that all such procedures and activities are considered to be within the scope of the present subject matter.

FIG. 4 is a flow chart of an example of an implementation of process 400 for performing automated energy transfer calculation and compensation based upon measured thermal energy transfer between adjoining building units and measured actual energy consumption in each of the adjoining building units. At block 402, the process 400 measures thermal energy transfer between the adjoining building units. At block 404, the process 400 measures actual energy consumption in each of the adjoining building units. At block 406, the process 400 calculates an energy compensation for each of the adjoining building units based upon the measured thermal energy transfer between the adjoining building units and the measured actual energy consumption in each of the adjoining building units.

FIG. 5 is a flow chart of an example of an implementation of process 500 for performing automated energy transfer calculation and compensation based upon measured thermal energy transfer between adjoining building units, measured actual energy consumption in each of the adjoining building units, expected energy consumption for the adjoining building units, and unit size and insulation information. At block 502, the process 500 determines expected energy consumption for adjoining building units. The expected energy consumption may be based upon any of the information described above, such as that stored within the database 114 in the expected energy usage storage area 116, the usage history storage area 118, and the thermal information storage area 120.

At block 504, the process 500 determines actual energy consumption for the adjoining building units. This determination may be made by receiving an energy consumption measurement from an energy usage measurement device, such as the energy usage measurement device 108 or may be calculated based upon other measured information, including cost per unit of the energy source (e.g., electricity, natural gas, or propane).

At decision point 506, the process 500 determines whether a difference exists between the expected energy consumption and the actual energy consumption for at least one of the adjoining building units. When a determination is made that there is not a difference between the expected energy consumption and the actual energy consumption for at least one of the adjoining building units, the process 500 returns to block 502 to iterate as described above. When a determination is made at decision point 506 that there is difference between the expected energy consumption and the actual energy consumption for at least one of the adjoining building units, the process 500 measures thermal energy transfer between the adjoining building units at block 508. This measurement includes measurements received from the one or more energy transfer measurement devices 110, as described above.

At block 510, the process 500 combines the thermal energy transfer information and the energy consumption information described above with unit size and insulation information, such as that stored within the thermal information storage area 120, to adjust the energy consumption information for unit size and insulation information. At decision point 512, the process 500 makes a determination as to whether the adjusted energy consumption exceeds expectations for at least one of the adjoining building units. When a determination is made that the adjusted energy consumption does not exceed expectations for at least one of the adjoining building units, the process 500 returns to block 502 to iterate as described above.

When a determination is made at decision point 512 that the adjusted energy consumption does exceed expectations for at least one of the adjoining building units, the process 500 performs an energy cost compensation at block 514. The energy cost compensation may include at least one of adding the measured thermal energy transfer to the measured actual energy consumption and subtracting the measured thermal energy transfer from the measured actual energy consumption for each of the adjoining building units. The energy cost compensation may also include adjusting the determined actual energy consumption based upon the determined expected energy consumption for one or more of the adjoining units.

For example, with reference to FIG. 2 and assuming a winter climate condition with the HVAC unit 106 producing heat, if the lower left building unit 202 has a larger than expected energy consumption and the upper left building unit 204 has a lower than expected energy consumption due to thermal energy transfer from the lower left building unit 202 to the upper left building unit 204, the process 500 may perform the energy cost compensation to adjust billing based upon the determined thermal energy transfer.

The energy cost compensation may include determining energy compensation information, such as an energy compensation value or an energy compensation parameter, to be used by a utility, such as the utility server 112, to adjust the differences in expectations with respect to energy consumption of the building units. The energy compensation value may be based upon the measured thermal energy transfer between the adjoining building units, the respective unit sizes, insulation information for the adjoining building units, and age of the insulation materials/building units. This energy compensation value may be subtracted from the larger than expected energy consumption for the lower left building unit 202 and added to the lower than expected energy consumption for the upper left building unit 204.

At block 516, the process 500 sends the energy cost compensation information to a utility, such as via the network 104 to the utility server 112. The process 500 returns to block 502 to iterate as described above.

As such, the process 500 performs automated energy transfer calculation and compensation. This automated energy transfer calculation and compensation is based upon measured thermal energy transfer between adjoining building units, measured actual energy consumption in each of the adjoining building units, expected energy consumption for the adjoining building units, and unit size and insulation information.

FIG. 6 is a flow chart of an example of an implementation of process 600 for performing automated energy transfer calculation and compensation based upon measured thermal energy transfer between adjoining building units, measured actual energy consumption in each of the adjoining building units, de-rated insulation ratings based upon materials and age of insulation, and expected energy consumption in each of the adjoining building units. The process 600 waits at decision point 602 for an indication to perform energy compensation activities. This indication may be received from an external module or process, such as the utility server 112, may be based upon a periodic or scheduled arrangement, or may be based upon a start-up or other activity associated with the cost sharing calculation device 102.

When a determination is made at decision point 602 that an indication to perform energy compensation activities has occurred, at block 604 the process 600 measures temperature values within a partition, such as the ceiling/floor partition 212 of FIG. 2, between the lower left building unit 202 and the upper left building unit 204. For example, the process 600 may receive temperature measurements or a thermal energy transfer measurement from the energy transfer measurement device 110. Additionally, the energy transfer measurement device 110 may be configured such that the process 600 measures at least two temperature values of at least two positions within a partition between the adjoining building units. The at least two positions may be located at different distances from a surface of the partition within at least one of the adjoining building units, such as from a ceiling surface in the lower left building unit 202.

At block 606, the process 600 selects an equation for use in processing the temperature values. The selected equation may be a linear equation, a polynomial equation, a gradient equation, or any other equation suitable for the processing described. A person of skill in the art will be able to select an appropriate equation based upon the present description and material properties for the respective partition.

At block 608, the process 600 processes the temperature values using the selected equation. At block 610, the process 600 determines a thermal energy transfer from the processed temperature values. For example, using a linear equation, extrapolation may be used to determine a thermal energy transfer through the respective partition. Curve fitting of the polynomial equation and solving the gradient equation for a thermal energy transfer are also considered within the scope of the present subject matter, as is any other approach to determining the thermal energy transfer.

At block 612, the process 600 receives actual energy consumption information for each of the adjoining building units from an energy measurement device, such as the energy usage measurement devices 108. At block 614, the process 600 calculates an initial energy compensation value based upon the determined thermal energy transfer. As described above, the calculation of the initial energy compensation may include adding the measured thermal energy transfer to the measured actual energy consumption and/or subtracting the measured thermal energy transfer from the measured actual energy consumption for each of the adjoining building units. Many other possibilities exist for calculating the initial energy compensation and all are considered within the scope of the present subject matter.

At decision point 616, the process 600 makes a determination as to whether to de-rate the initial energy compensation value based upon insulation properties for at least one of the adjoining building units. This determination may be based upon configuration information or other criteria without departure from the scope of the present subject matter. When a determination is made at decision point 616 not to de-rate the initial energy compensation value based upon insulation properties for at least one of the adjoining building units, the process 600 makes a determination at decision point 618 as to whether to adjust the initial energy compensation (or a de-rated energy compensation as described in more detail below) based upon expected energy consumption. When a determination is made at decision point 618 not to adjust the initial energy compensation based upon expected energy consumption, the process 600 sends the initial energy compensation to a utility server, such as the utility server 112, at block 620 and returns to decision point 602 to await another indication to perform energy compensation activities.

Returning to the description of decision point 616, when a determination is made to de-rate the initial energy compensation value based upon insulation properties for at least one of the adjoining building units, the process 600 determines material properties of a partition that separates the adjoining building units at block 622. For example, the process 600 may read insulation material construction and other information from the thermal information storage area 120 in the database 114.

At block 624, the process 600 determines an initial insulation rating for the partition. Again, the process 600 may determine this information from information stored within the thermal information storage area 120 in the database 114. At block 626, the process 600 adjusts the determined initial energy compensation for age of the partition based upon the determined material properties and determined insulation rating to form a de-rated energy compensation for the adjoining building units.

For example, older buildings may have insulation materials that degrade over time and loose insulation capabilities. In such a situation, the process 600 adjusts the initial energy compensation for the age of the partition based upon the determined material properties for the insulation to form the de-rated energy compensation. The process 600 transitions to decision point 618 to continue processing as described above and in more detail below.

Returning to the description of decision point 618, when the process 600 makes a determination not to adjust the initial energy compensation or the de-rated energy compensation for expected energy consumption, the process 600 sends the calculated energy consumption to the utility server at block 620 as described above and returns to decision point 602 to await another indication to perform energy compensation activities. When a determination is made at decision point 618 to adjust the initial energy compensation or the de-rated energy compensation for expected energy consumption, the process 600 determines expected energy consumption at block 628. For example, the process 600 may read expected energy consumption values for the adjoining building units from the expected energy usage storage area 116 within the database 114 or may receive the expected energy consumption for the adjoining building units from the utility server 112. The determination of expected energy consumption may further include determining at least one of a volume of each of the adjacent building units, historical thermostat setting information for each of the adjacent building units, historical energy consumption for each of the adjacent building units, and historical environmental temperature data in an area of the adjacent building units. Many other possibilities exist for determining expected energy consumption of adjoining building units and all are considered within the scope of the present subject matter.

At block 630, the process 600 compares the actual energy consumption with the expected energy consumption for each of the adjoining building units. At block 632, the process 600 calculates a difference between the actual energy consumption and the expected energy consumption for each of the adjoining building units. At block 634, the process 600 adjusts either the initial energy compensation or the de-rated energy compensation based upon the difference between the actual energy consumption and the expected energy consumption for each of the adjoining building units. The process 600 sends the calculated energy consumption to the utility server at block 620 as described above and returns to decision point 602 to await another indication to perform energy compensation activities.

Accordingly, the process 600 provides automated energy transfer calculation and compensation for adjoining building units. The automated energy transfer calculation and compensation is based upon measured thermal energy transfer between adjoining building units, measured actual energy consumption in each of the adjoining building units, de-rated insulation ratings based upon materials and age of insulation, and expected energy consumption in each of the adjoining building units.

As described above in association with FIGS. 1 through 6, the example systems and processes provide automated energy transfer calculation and compensation for adjoining building units. Many other variations and additional activities associated with automated energy transfer calculation and compensation are possible and all are considered within the scope of the present subject matter.

Those skilled in the art will recognize, upon consideration of the above teachings, that certain of the above exemplary embodiments are based upon use of a programmed processor such as the CPU 300. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention has been described with reference to flowchart illustrations and/or block diagrams of methods, apparatus (systems) and computer program products according to example embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible example implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Those skilled in the art will recognize improvements and modifications to the preferred embodiments of the present invention. All such improvements and modifications are considered within the scope of the concepts disclosed herein and the claims that follow.

What is claimed is:

1. A method comprising:
   measuring at least two temperature values of at least two positions within a partition between adjoining building units, the at least two positions located at different distances from a surface of the partition within at least one of the adjoining building units;
   processing the at least two temperature values using at least one of a linear equation, a polynomial equation, and a gradient equation;
   extrapolating a thermal energy transfer from the processed at least two temperature values;
   measuring actual energy consumption in each of the adjoining building units; and
   calculating, via a computer, an energy compensation for each of the adjoining building units based upon the extrapolated thermal energy transfer between the adjoining building units and the measured actual energy consumption in each of the adjoining building units, where calculating the energy compensation for each of the adjoining building units further comprises:
      determining an expected energy consumption for each of the adjoining building units based upon at least one of a volume of each of the adjoining building units, historical thermostat setting information for each of the adjoining building units, historical energy consumption for each of the adjoining building units, and historical environmental temperature data in an area of the adjoining building units;
      calculating a difference in the measured actual energy consumption for each of the adjoining building units relative to the expected energy consumption for each of the adjoining building units;
      adjusting the calculated energy compensation based upon the calculated difference; and
      sending the adjusted calculated energy compensation for each of the adjoining building units to a utility server for billing adjustment.

2. The method of claim 1, where measuring the at least two temperature values of at least two positions within the partition between the adjoining building units comprises receiving at least two thermal energy transfer measurements from at least one thermal energy transfer measurement device.

3. The method of claim 1, where measuring the actual energy consumption in each of the adjoining building units comprises receiving an energy consumption measurement from an energy usage measurement device.

4. The method of claim 1, where calculating the energy compensation for each of the adjoining building units comprises at least one of adding the extrapolated thermal energy transfer to the measured actual energy consumption and subtracting the extrapolated thermal energy transfer from the measured actual energy consumption for each of the adjoining building units.

5. The method of claim 1, where determining the expected energy consumption for each of the adjoining building units further comprises:
   determining material properties of the partition between the adjoining building units;
   determining an initial insulation rating for the partition;
   adjusting the initial insulation rating for an age of the partition based upon the material properties of the partition; and
   adjusting the expected energy consumption based upon the adjusted insulation rating.

6. A system comprising:
   a memory adapted to store information associated with energy consumption; and
   a processor programmed to:
      measure at least two temperature values of at least two positions within a partition between adjoining building units, the at least two positions located at different distances from a surface of the partition within at least one of the adjoining building units;
      process the at least two temperature values using at least one of a linear equation, a polynomial equation, and a gradient equation;
      extrapolate a thermal energy transfer from the processed at least two temperature values;
      measure actual energy consumption in each of the adjoining building units; and
      calculate an energy compensation for each of the adjoining building units based upon the extrapolated thermal energy transfer between the adjoining building units and the measured actual energy consumption in each of the adjoining building units, where in being adapted to calculate the energy compensation for each of the adjoining building units, the processor is further programmed to:
         determine an expected energy consumption for each of the adjoining building units based upon at least one of a volume of each of the adjoining building units, historical thermostat setting information for each of the adjoining building units, historical energy consumption for each of the adjoining building units, and historical environmental temperature data in an area of the adjoining building units;

calculate a difference in the measured actual energy consumption for each of the adjoining building units relative to the expected energy consumption for each of the adjoining building units;

adjust the calculated energy compensation based upon the calculated difference; and send the adjusted calculated energy compensation for each of the adjoining building units to a utility server for billing adjustment.

7. The system of claim 6, where in being programmed to measure the at least two temperature values of at least two positions within the partition between the adjoining building units, the processor is programmed to receive at least two thermal energy transfer measurements from at least one thermal energy transfer measurement device.

8. The system of claim 6, where in being programmed to measure the actual energy consumption in each of the adjoining building units, the processor is programmed to receive an energy consumption measurement from an energy usage measurement device.

9. The system of claim 6, where, in being programmed to calculate the energy compensation for each of the adjoining building units, the processor is programmed to at least one of add the extrapolated thermal energy transfer to the measured actual energy consumption and subtract the extrapolated thermal energy transfer from the measured actual energy consumption for each of the adjoining building units.

10. The system of claim 6, where, in being programmed to determine the expected energy consumption for each of the adjoining building units, the processor is further programmed to:

determine material properties of the partition between the adjoining building units;

determine an initial insulation rating for the partition;

adjust the initial insulation rating for an age of the partition based upon the material properties of the partition; and adjust the expected energy consumption based upon the adjusted insulation rating.

\* \* \* \* \*